Sept. 21, 1954 W. BOYD ET AL 2,689,682
GAS TURBINE COMPRESSOR
Filed Jan. 6, 1951 3 Sheets-Sheet 1

INVENTORS
W. BOYD
J. P. LAVIOLETTE
B. A. AVERY
PER
ATTORNEY

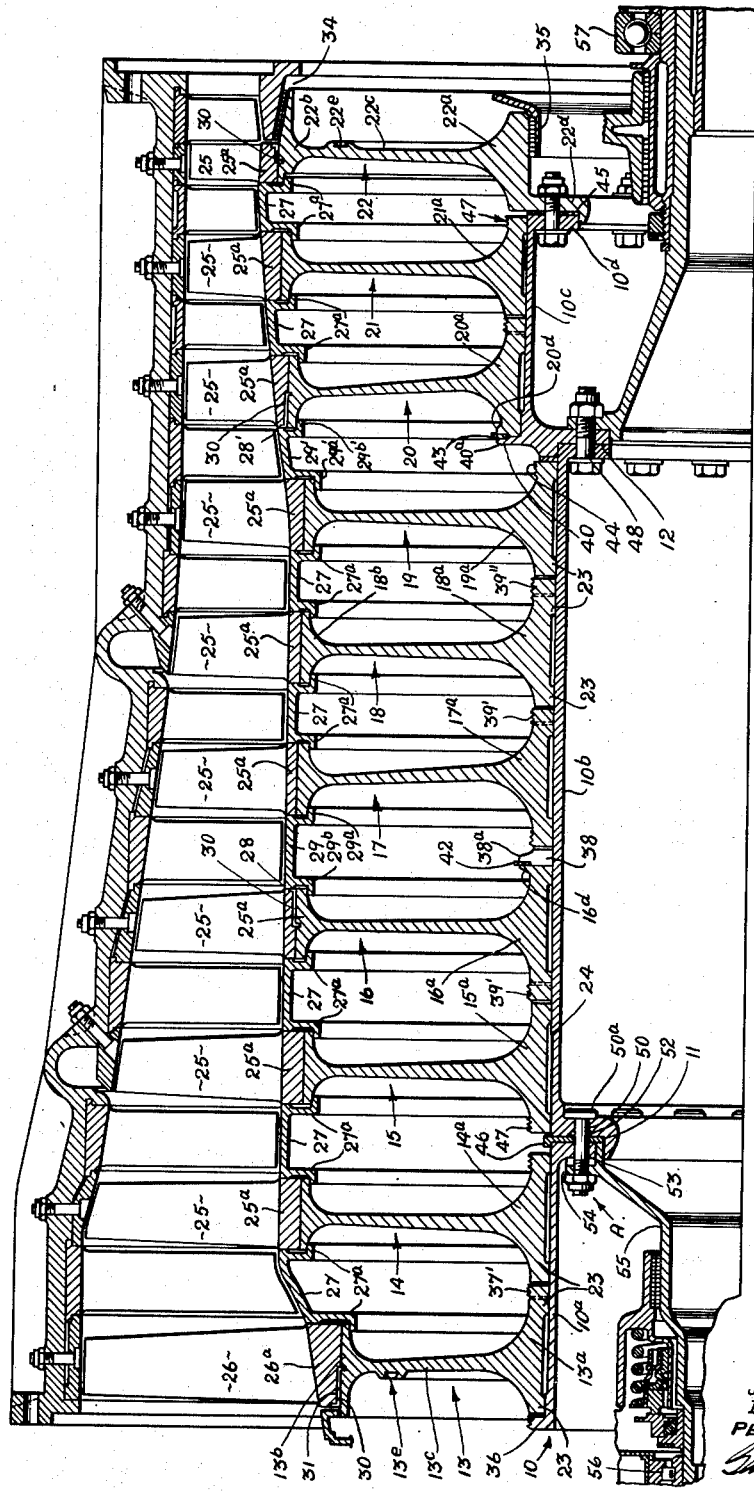

Sept. 21, 1954  W. BOYD ET AL  2,689,682
GAS TURBINE COMPRESSOR

Filed Jan. 6, 1951  3 Sheets-Sheet 3

INVENTORS
W. BOYD
J.P. LAVIOLETTE
B.A. AVERY
PER
ATTORNEY.

Patented Sept. 21, 1954

2,689,682

UNITED STATES PATENT OFFICE 2,689,682

GAS TURBINE COMPRESSOR

Winnett Boyd, Bobcaygeon, Ontario, Burton Albert Avery, Weston, Ontario, and Jean Paul Laviolette, Toronto, Ontario, Canada, assignors to A. V. Roe Canada Limited, Malton, Ontario, Canada, a corporation Application January 6, 1951, Serial No. 204,753

5 Claims. (Cl. 230—134)

This invention relates to rotary power conversion machines and particularly to axial flow compressors used in aircraft gas turbine engines.

The rotor of an axial compressor is required to meet extremely exacting operating conditions; it is subjected to very high rotational speeds, involving centrifugal stresses of considerable magnitude; it is subjected to rapid temperature changes at its periphery; it is subjected to varying axial loads reacting upon the blading from the working fluid; and in some applications, as in aircraft gas turbine engines, it must withstand gyroscopic forces due to the manoeuvres of the vehicle in which the engine is installed. To minimize the centrifugal and gyroscopic stresses it is important that the structure of the rotor should be as light as possible and this requirement is of added significance in the application to aircraft gas turbine engines, wherein the saving of overall weight is a primary consideration. The structure must therefore be an efficient structure, using every part as economically as possible and avoiding indeterminate factors for which estimated allowances must be made. For example, it has been mentioned that the periphery of the rotor is subject to temperature changes: on acceleration the increased compression attained at the higher speed causes a rise in temperature of the working fluid and, in turn, of the blading and the periphery of the rotor, with which the working fluid is in contact; this results in an expansion of the outer surfaces of the rotor in relation to the more central components thereof. During a short period of operation at the higher speed the heat is conducted inwardly, raising the temperature of the more central components until a stable condition is restored, but on subsequent deceleration the temperature of the working fluid and of the peripheral parts of the rotor will fall, resulting in a contraction of the outer surfaces of the rotor in relation to the more central components. Unless provision is made in the design of the rotor to absorb such differential thermal expansions and contractions, stresses will be set up thereby, and measures taken to absorb such stresses must inevitably entail an increase in the weight of the structure. The foregoing is but one example to illustrate how non-functional stresses may occur in the structure of a rotor and to emphasize the importance of eliminating such factors in order to obtain the most efficient, and therefore the lightest, conformation.

The object of this invention is to provide a compressor rotor which is so constructed that indeterminate factors are avoided, thereby minimising structural weight while ensuring sufficient strength to withstand the centrifugal, gyroscopic and fluid-dynamic forces to which it may be subjected in operation.

Other objects and advantages of the invention will be apparent during the course of the following description.

In the accompanying drawings forming a part of this specification and in which like reference characters designate like parts throughout the several views:

Fig. 2 is the upper half of a longitudinal cross-sectional view taken through a gas turbine engine air compressor in which the invention is embodied;

Figure 1:
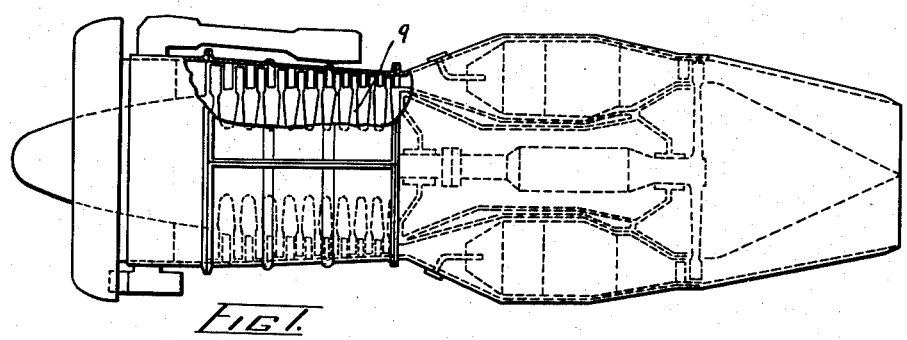
Fig. 1 is a side elevation of a gas turbine engine in which is incorporated a compressor rotor constructed according to the invention.

Throughout this description it should be remembered that air is drawn through the compressor 9 from the left-hand end to the right-hand end of the compressor, with reference to an observer viewing Fig. 1, and hereinafter the left-hand end of the compressor will be referred to as the front or upstream end and the right-hand end of the compressor will be referred to as the rear or downstream end; terms of relative position such as "forwardly" and "rearwardly" or "upstream" and "downstream" will be used as pertaining to position relative to the said ends.

The rotor of the compressor 9 comprises a cylindrical rotor drum 10 providing with the main shaft a rotating shaft member on which are mounted bladed discs as will be described. The compressor illustrated has ten stages and for each stage a disc carries a circumferential row of blades.

The rotor drum 10 consists of a front section 10$^a$, a central section 10$^b$ and a rear section 10$^c$, which sections are bolted together at the joints 11 and 12. With each stage of the compressor there is associated one of ten annular discs 13, 14, 15, 16, 17, 18, 19, 20, 21 and 22. The discs are of I-section, each having an inner rim indicated in the drawings by the reference numeral of the corresponding disc with a superscript $a$, an outer rim indicated by the reference numeral of the corresponding disc with a superscript $b$, and a web connecting the inner and outer rims and indicated by the reference numeral of the disc with a superscript $c$. While the webs of the majority of the discs are flat, selected discs have webs which are "dished," being for instance, slightly conical in shape, as will be described hereunder.

Each of the discs 13 to 21 has two projecting annular lands 23 at its inner periphery to provide bearing surfaces between the discs and the rotor drum 10. The discs 13 to 21 are mounted around the drum 10 by being shrunk onto the drum, and the respective dimensions of the discs and the drum are so arranged that there is a slight interference fit between the disc and the drum on one of the two lands on each disc, sufficient to ensure a positive grip during all conditions of centrifugal loading. The drum 10 is preferably stepped progressively, as illustrated for example at the location indicated by reference numeral 24 in order to facilitate assembly by shortening the longitudinal range for each disc over which the shrink fit is effective. The mounting of the rearmost disc 22 differs from that of the others; an annular flange 22$^d$ extends radially inwardly from the inner rim 22$^a$ and is bolted to an annular flange 10$^d$ on the rear rotor drum section 10$^c$; the annular flange 22$^d$ in effect constitutes a fourth section of the drum 10 and is so referred to herein.

Figure 3:
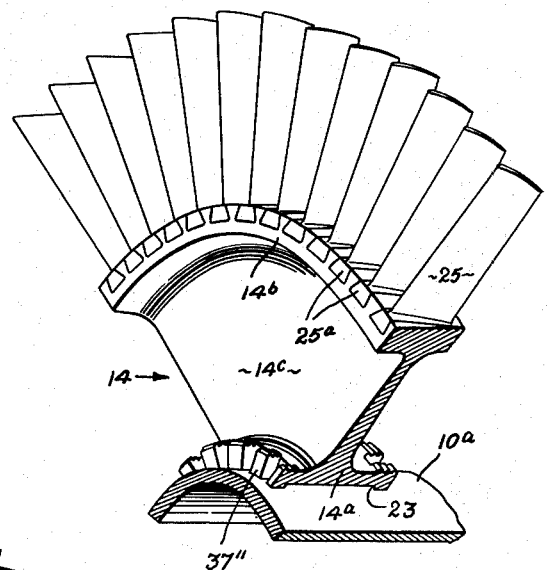
Fig. 3 is a fragmentary perspective view of a disc and blade assembly constructed in accordance with the invention.
Figure 4:
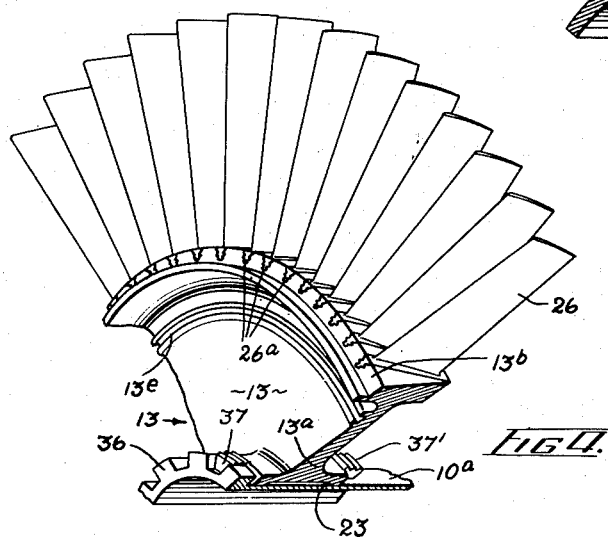
Fig. 4 is a fragmentary perspective view illustrating particularly the front disc and drum interengaging means constructed in accordance with the invention but prior to assembly, and also illustrating the front disc and blade assembly also constructed in accordance with the invention.

Rotor blades 25 having dovetail roots 25$^a$ are mountd in dove-tail slots in the outer periphery of each of the discs 14 to 22, the front and rear extremities of the blade roots 25$^a$ being flush with the front and rear annular edge faces of the outer rims 14$^b$ to 22$^b$ of the discs, as particularly illustrated in Fig. 3 showing a fragment of disc 14 as a particular example. Similar rotor blades 26 having "fir-tree" roots 26$^a$ as particularly illustrated in Fig. 4 are mounted in suitable slots in the outer periphery of the disc 13 at the extreme front of the compressor. The rotor blades 25 are of light alloy construction whereas the rotor blades 26 are made of steel to afford greater resistance to turbulence and abrasion which are particularly prevalent at the front of the compressor. Similar steel blades having fir tree roots may be advantageously employed in other upstream stages, that is mounted upon say discs 14 and 15 as a variation of the construction described herein.

Spacer rings 27 with laterally extending flanges 27$^a$ are provided between adjacent discs (except between discs 16 and 17 and between discs 19 and 20 as will be described hereunder). The laterally extending flanges 27$^a$ engage the outer rims on the discs to maintain concentricity of the spacer rings and to transmit to the discs a part of any centrifugal load which may exist in the spacer rings. The abutment of the spacer rings 27 against the front and rear edge faces of the outer rims of the discs serves to retain the dovetail roots 25$^a$ of the blades 25 in position. However, in order to accommodate differential expansion between the outer peripheral wall of the rotor—composed of the outer rims of the discs and the spacer rings—and the drum 10, expansion gaps as indicated by reference numeral 28 at the rear face of disc 16 and by reference numeral 28' at the front face of disc 20 are provided at suitable intervals, so that not all the spacer rings abut tightly against the adjacent disc over the whole length of the rotor. At the expansion gaps 28 and 28', modified spacer rings 29 and 29' respectively having specially fitted asymmetrical flanges 29$^a$, 29$^b$ and 29$^{a'}$, 29$^{b'}$ respectively are provided; on the rear side of the modified spacer ring 29 and on the front side of the modified spacer ring 29' the specially fitted asymmetrical flanges 29$^a$ and 29$^{a'}$ respectively hold the said rings 29 and 29' against the adjacent disc 17 and 19 respectively, the flanges 29$^a$ and 29$^{a'}$ being arranged with a slight interference fit providing radially outward pressure against the rims 17$^b$ and 19$^b$ respectively. On the opposite sides of each of the spacer rings 29 and 29' respectively the specially fitted flanges 29$^b$ and 29$^{b'}$ are arranged with a sliding fit within the adjacent rims 16$^b$ and 20$^b$ respectively.

Figure 5:
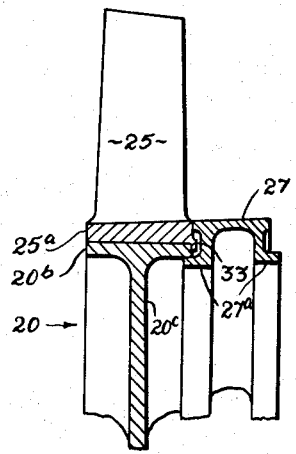
Fig. 5 is a fragmentary longitudinal cross-sectional view of an alternative blade-securing arrangement in accordance with the invention.

At the expansion gaps 28 and 28' and at the extreme front and rear ends of the rotor, where the abutment of spacer rings to hold the blade roots in place is lacking, the blades are individually held in position against axial displacement by means of wires 30 connecting the blade root 26$^a$ and the other blade roots 25$^a$ with the outer periphery of the discs 13, 16, 20 and 22 as the case may be. Axial slots 31 are provided in the roots of the blades to receive the wires, which are bent radially inwardly to project into small radial holes located in the outer periphery of the corresponding disc, the other ends of the wires 30 being bent up into recesses 32 in the front and rear faces of the said roots 26$^a$ and 25$^a$ as appropriate. Alternatively, the wires 30 may be replaced by small lugs 33 (see Fig. 5) extending radially inwardly from the said blade roots 26$^a$ and 25$^a$ and engaging the rear faces of the discs 13 and 20 and the front faces of the disc 16 and 22, as the case may be, to secure the blades against axial displacement.

The rearmost disc 22 has its inner rim 22$^a$ and its outer rim 22$^b$ formed as shown in Fig. 2 to accommodate annular labyrinth glands 34 and 35.

Figure 6:
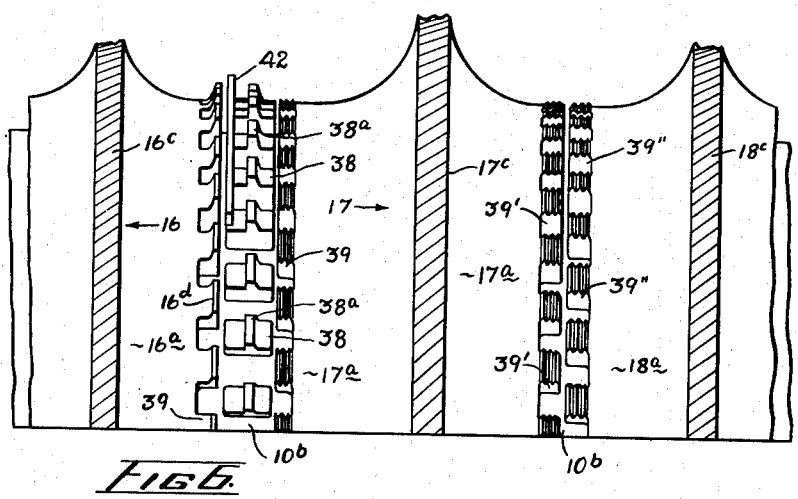
Fig. 6 is a fragmentary perspective view of the disc and drum interengaging means at an intermediate location on the drum.

Torque is transmitted from the rotor drum 10 to the first disc 13 by means of dogs 36 on the forward end of the front section 10$^a$ of the rotor drum, which dogs engage dogs 37 on the forward face of the inner rim 13$^a$ of the disc 13. Similar dogs 37' on the rear face of the inner rim 13$^a$ interengage with dogs 37" (see Fig. 3) on the front face of the inner rim 14$^a$ of the disc 14 to transmit the torque to the said disc 14. In a similar manner the torque is transmitted to discs 16 and 17 by dogs 38 on the central section 10$^b$ of the rotor drum 10, which dogs 38 engage dogs 39 (see Fig. 6) on the rear face of the inner rim 16$^a$ of the disc 16 and on the front face of the inner rim 17$^a$ of the disc 17. Similar dogs 39' on the front face of the inner rim 16$^a$ of the disc 16, on the rear face of inner rim 17$^a$ of the disc 17 and on the front face of the inner rim 19$^a$ of the disc 19 interengage with corresponding dogs 39" on the rear face of the inner rim 15$^a$ of the disc 15, and on the front and rear faces of the inner rim 18$^a$ of the disc 18 respectively, thereby transmitting torque to the discs 15, 18 and 19.

Dogs 40 at the forward end of the rear drum rotor section 10ᶜ transmit torque to the disc 20 by interengagement with corresponding dogs on the front face of the inner rim 20ᵃ of the disc 20, and the torque is transmitted in turn to the disc 21 by dogs on the rear face of the inner rim 20ᵃ which engage corresponding dogs on the front face of the inner rim 21ᵃ of the disc 21. The torque is transmitted to the rearmost disc 22 by its bolted connection to the flange 10ᵇ on the rotor drum 10.

The dogs 38 have a circumferential ridge 38ᵃ across their radially outer surface, and there is an opposing circumferential ridge 16ᵈ around the radially outer surface of the inner rim 16ᵃ of the disc 16, the ridges 38 and 16ᵈ being spaced apart to receive a suitable shim 42. Similarly a circumferential ridge 40ᵃ on the dogs 40 is spaced from a circumferential ridge 20ᵈ on the inner rim of the disc 20 to receive a suitable shim 43.

It is an important feature of this invention that except for the axial abutment of the discs 13, 17 and 20 against the corresponding dogs 36, 38 and 40, no reactive axial load is transmitted through the dogs to the discs. The outer rims of the discs and the spacer rings constitute a sectional annulus supported on the drum or shaft member by the webs of the discs. The discs may be regarded as arranged in three groups each constituting a section of the annulus, the front group between the front of the rotor and the expansion gap 28, the central group between the expansion gap 28 and the expansion gap 28′ and the rear group between the expansion gap 28′ and the rear of the rotor. The axial load or the compressive force for holding the discs together within each of these groups is wholly transmitted through the circumferential spacer rings 27.

The webs 13ᶜ, 17ᶜ and 20ᶜ of the front disc 13 and of the discs 17 and 20 respectively are conical in shape or similarly dished, so that under centrifugal loads these discs tend to straighten out and exert a rearward force on the respective section of the annulus to the rear of each of the conical discs. This effect counterbalances, to some extent, the air loads acting forwardly on the rotor blades and thereby reduces the bending loads on the discs. The angle of the apex of these conical discs is not critical, and may be of the order of 175°. Furthermore, the webs 13ᶜ and 22ᶜ are provided with circular grooves 13ᵉ and 22ᵉ respectively for the insertion of balance weights as may be required.

In the assembly of the compressor, the rotor blades are mounted in the fir-tree and dovetail slots in the discs, and then the discs 17, 18 and 19 are slid on the central section 10ᵇ of the drum 10 with the spacer rings 27 between discs 17 and 18, and between discs 18 and 19, the discs 17 and 19 having the modified spacer rings 29 on their front and rear faces respectively. The disc 17 abuts against the dogs 38 but axial clearance is provided at the dogs 39′ and 39″ between the discs 17 and 18 and the discs 18 and 19, so that any axial load between the discs is transmitted only through the spacer rings at their peripheries. At the rear face of the disc 19 a shim 44 of suitable thickness is inserted between the disc 19 and the rear section 10ᶜ of the drum 10 and the joint 12 is assembled with the shim 44 in place to ensure a posititve compressive load holding the central group of discs together.

The rear group of discs is then assembled in the same manner; the width of the expansion gap 28′ is adjusted by means of the shim 43 inserted in the space between the ridge 40ᵃ on the dogs 40 and the ridge 20ᵈ. The compressive load in the rear group of discs is determined and limited by inserting a suitable shim 45 between the flange 10ᵈ on the drum 10 and the flange 22ᵈ on the disc 22 before bolting the flanges together.

The front group of discs is assembled in two parts; the disc 13 is slid on the front section 10ᵃ until the said disc abuts against the dogs 36, the adjacent spacer ring 27 is installed and the disc 14 is slid on the drum section so as to abut against the spacer ring 27, which provides some axial clearance at the interengagement of the dogs 37′ and 37″; the discs 15 and 16 are then assembled on the center section 10ᵇ of the drum 10, the width of the expansion gap 28 being adjusted by means of the shim 42 between the ridges 38ᵃ on the dogs 38 and the ridge 16ᵈ on the disc 16. A shim 46 of suitable width is then inserted in the assembly of the joint 11 to determine and limit the compressive load, transmitted through the spacer rings, in the front group of discs.

Since the discs are shrunk on the drum in their respective positions, it is desirable that an external thread 47 be provided on the dogs or rims of the discs to accommodate a special extracting tool and enable the discs to be removed in dismantling the compressor assembly.

Figure 7:
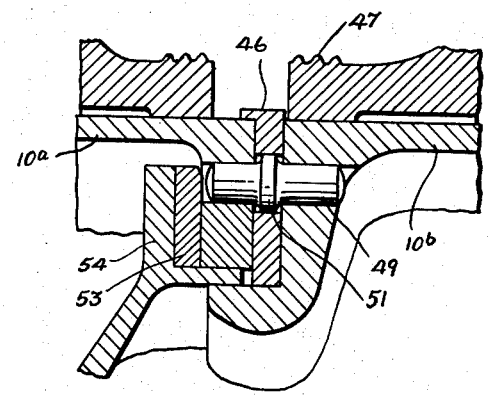
Fig. 7 is an enlarged sectional view of the joint assembly indicated by arrow A in Fig. 2, showing the assembly of the torque transmitting pins in the front drum joint.

The rear mounting of the drum on its bearings is effected by means of the joint 12, where a ring of fitted bolts 48 picks up a flange on the main shaft. Similarly the front mounting of the drum is effected through the joint 11 but here, because this joint is assembled last, the use of fitted bolts is difficult and impracticable. Torque is, therefore, transmitted to the drum by means of fitted pins 49 (see Fig. 7) and bolts 50 (shown in Fig. 2) are provided to resist any bending stress. The fitted pins 49 extend through the shim 46 and are prevented from falling out by the flanges 51. The bolts 50 have eccentric heads 50ᵃ to prevent them from turning and they are secured to the centre section 10ᵇ of the drum by flush circlips 52. Thus they serve as studs, but this method of assembly eliminates the usual complications which screwed studs entail. The bolts pick up the front section 10ᵃ of the drum, a suitable shim 53 and the flange 54 on the main shaft 55. The thickness of the shim 53 is governed by the distance between the front bearing 56 and the rear bearing 57.

It will be noted that this construction, wherein the front and rear sections 10ᵃ and 10ᶜ of the drum 10 overhang the drum mountings at the joints 11 and 12, enables the distance between the front and rear bearings 56 and 57 to be kept to a minimum compatible with the length of the compressor, and this reduction of length raises the natural frequency of the assembly and so raises the critical speed.

It is to be understood that the form of the invention, herewith shown and described, is to be taken as a preferred example of the same, and that various changes in the shape, size and arrangement of the parts may be resorted to, without departing from the spirit of our invention or the scope of the claims.

What we claim as our invention is:

1. A rotor for a rotary power conversion machine in which a stream of fluid flows, comprising a rotatable drum consisting of at least two coaxially abutting drum sections, at least two axially spaced groups of discs mounted coaxially upon the drum, spacing means between the groups, each group consisting of a plurality of axially spaced coaxial discs having peripheral outer rims, each rim having a peripheral surface and an annular upstream face and an annular downstream face, blades radially extending from the discs and actable upon the stream of fluid, and spacer rings located between the rims of adjacent discs in each group and abutting the opposed annular faces of the adjacent discs, means on the drum securing the disc at the upstream end of each group against movement upstream relative to the drum, and means securing the disc at the extreme downstream end of the drum against movement downstream relative to the drum, the abutting ends of the drum sections having juxtaposed internal flanges providing a circumferential joint in the drum, the joint being secured by a plurality of spaced securing members connecting and holding together the juxtaposed flanges, the minimum total axial length of the assembled discs, spacer rings and spacing means measured between radial planes containing the extreme upstream face and the extreme downstream face of the inner rims of the discs at the ends of the drum being greater than the sum of the axial lengths of the portions of the drum sections lying between the said radial planes and the discs being generally movable on the drum whereby the securing members will apply a static compressive load to the abutting group spacing means, rims, and spacer rings, and torque transmitting means connecting the drum and the discs.

2. A rotor for a rotary power conversion machine in which a stream of fluid flows, comprising a rotatable drum, at least two axially spaced groups of annular discs mounted coaxially upon the drum; each group consisting of a plurality of axially spaced coaxial discs having peripheral outer rims, each rim having a peripheral surface and an annular upstream face and an annular downstream face, blades radially extending from the discs and actable upon the stream of fluid, spacer rings located between the rims of adjacent discs and abutting the opposed annular faces of the rims of the adjacent discs in each group, means securing the disc at the upstream end of each group against movement upstream relative to the drum, the said upstream disc in each group being a dished disc having its outer periphery upstream of its inner periphery, which dished disc when rotating tends to flatten as a result of centrifugal force thereby applying an axial load upon the abutting rims, and spacer rings in the said group in opposition to and substantially proportional to the reaction of the stream of fluid upon the blades on the discs in the said group, and torque transmitting means connecting the drum and the discs.

3. A rotor for a rotary power conversion machine in which a stream of fluid flows, comprising a rotatable drum consisting of at least two coaxially abutting drum sections, at least two axially spaced groups of discs mounted coaxially upon the drum, spacing means between the groups, each group consisting of a plurality of axially spaced coaxial discs having peripheral outer rims; each rim having a radially outer peripheral surface, a radially inner surface at each side of the disc, an annular upstream face, an annular downstream face and circumferentially spaced slots traversing the peripheral surface substantially axially; blades radially extending from the discs and actable upon the stream of fluid, spacer rings located between the rims of adjacent discs in each group and abutting the opposed annular faces of the rims of the adjacent discs, means securing the disc at the upstream end of each group against movement upstream relative to the drum, the said upstream disc in each group being a dished disc having its outer periphery upstream of its inner periphery, which dished disc when rotating tends to flatten as a result of centrifugal force thereby applying an axial load upon the abutting rims, and spacer rings in the said group in opposition to and substantially proportional to the reaction of the stream of fluid upon the blades on the discs in the said group, means securing the disc at the extreme downstream end of the drum against movement downstream relative to the drum, the abutting ends of the drum sections having juxtaposed internal flanges providing a circumferential joint in the drum, the joint being secured by a plurality of spaced bolts passing axially through and holding together the juxtaposed flanges, the minimum total axial length of the assembled discs, rims, spacer rings and spacing means measured between radial planes containing the extreme upstream face and the extreme downstream face of the inner rims of the discs at the ends of the drum being greater than the sum of the axial lengths of the portions of the drum sections lying between the said radial planes whereby the bolts will apply a static compressive load to the abutting group spacing means, rims, blade roots, and spacer rings, and torque transmitting means connecting the drum and the discs.

4. A rotor as claimed in claim 3 in which the spacer rings have axially disposed annular flanges bearing upon the radially inner surfaces of the peripheral outer rims of the adjacent discs to position the rings radially with respect to the rims and to transmit to the discs a part of the centrifugal load imposed upon the rings when rotating.

5. A rotor for a rotary power conversion machine in which a stream of fluid flows, comprising bearings mounted on the machine, a drum consisting of at least two coaxially abutting drum sections, means at the junction of two of said drum sections mounting the drum on the bearings, at least two axially spaced groups of discs mounted coaxially upon the drum, spacing means between the groups, each group consisting of a plurality of axially spaced coaxial discs having peripheral outer rims, inner rims and an annular web between the outer and inner rims; each outer rim having a radially outer peripheral surface, a radially inner surface at each side of the web, an annular upstream face, and an annular downstream face; blades radially extending from the discs and actable upon the stream of fluid, symmetrical spacer rings located between the outer rims of mutually adjacent discs in each group and abutting the opposed annular faces of the outer rims of the adjacent discs, each of the symmetrical spacer rings having an upstream and a downstream axially disposed annular flange bearing upon the inner surfaces of the peripheral outer rims of the adjacent upstream and downstream discs respectively, asymmetrical spacer rings between the groups, the asymmetrical spacer rings being interposed between the opposed annular faces of the rims of the adjacent discs at the upstream and opposed downstream end of each adjacent group and each of them having an upstream and a downstream axially disposed annular flange one of which flanges bears with an interference fit upon the inner surface of the peripheral outer rim of the disc proximate to the said flange and the other of which slidingly engages the radially inner surface of the peripheral outer rim of the disc proximate to the said other flange, dogs on the drum and the discs for transmitting torque between the drum and the discs, means securing the discs at the upstream end of each group against movement upstream relative to the drum, the web of the said upstream disc in each group being conical in form with its outer periphery upstream of its inner periphery, which conical web when rotating tends to flatten as a result of centrifugal force thereby applying an axial load upon the abutting outer rims, and spacer rings in the said group in opposition to and substantially proportional to the reaction of the stream of fluid upon the blades on the discs in the said group, means securing the disc at the extreme downstream end of the drum against movement downstream relative to to the drum, spacing means between adjacent groups, the spacing means being disposed between the inner rims of the adjacent end discs at the upstream end and opposed downstream ends of adjacent groups, the abutting ends of the drum sections having juxtaposed internal flanges providing a circumferential joint in the drum, the joint being secured by a plurality of spaced securing members passing axially through and holding together the juxtaposed flanges, the minimum total axial length of the assembled discs, rims, spacer rings and spacing means measured between radial planes containing the extreme upstream face and the extreme downstream face of the inner rims of the discs at the ends of the drum being greater than the sum of the axial length of the portions of the drum sections lying between the said radial planes whereby the securing members will apply a static compressive load to the abutting outer rims, blade roots, symmetrical spacer rings and spacing means.

References Cited in the file of this patent

UNITED STATES PATENTS

| Number | Name | Date |
|---|---|---|
| 2,434,935 | Kroon | Jan. 27, 1948 |
| 2,452,782 | McLeod | Nov. 2, 1948 |
| 2,497,151 | Clark | Feb. 14, 1950 |
| 2,548,886 | Howard | Apr. 17, 1951 |
| 2,553,442 | Clark | May 15, 1951 |
| 2,575,237 | Sollinger | Nov. 13, 1951 |